2,809,965

PHTHALIDES

Donald D. Wheeler and David C. Young, Midland, Mich., assignors to The Dow Chemical Company, Midland, Mich., a corporation of Delaware No Drawing. Application April 30, 1956,
Serial No. 581,353

9 Claims. (Cl. 260—209)

This invention is concerned with mono and poly phthalidyl derivatives of aliphatic polyhydroxy compounds having at least three hydroxyl groups.

The compounds of the invention are liquids or solids, depending upon the length and composition of the polyhydroxy compound attached to the phthalidyl nucleus and the number of phthalidyl groups in the compound. The solubility of these compounds is also influenced by these considerations. Certain of them which retain most of their polyhydroxy groups are soluble in polar solvents while others are more soluble in organic solvents, and still others are of very low solubility or merely swell in solvents. These compounds have microbicidal properties and inhibit the growth of certain bacteria and fungi.

The expression "phthalidyl" refers to the radical

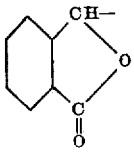

resulting from the removal of the hydroxyl group from the structure of phthalaldehydic acid. The terms "phthalaldehydic acid" and "3-hydroxyphthalide" refer to a compound having the structure

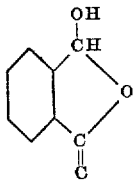

Phthalaldehydic acid is often represented in the literature as having the structure

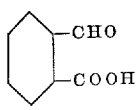

However, the acid employed in this invention and prepared as hereinafter described exists almost entirely in the closed ring, 3-hydroxyphthalide structure, as observed from a study of its infrared absorption spectrum. Infrared data also indicate the phthalidyl product to have a closed ring, 3-hydroxyphthalide structure with the open chain ester sometimes being formed as a by-product.

The novel phthalidyl compounds may be prepared by causing phthalaldehydic acid to react with an appropriate polyhydroxy compound containing at least three hydroxy groups to obtain the desired phthalidyl derivative of the aliphatic polyhydroxy compound and water of reaction. The relative amounts of the reactants employed depend on the polyhydroxy compound employed and on whether a mono or poly phthalidyl derivative is to be prepared. Thus, if a monophthalidyl derivative is to be prepared, equimolar proportions of the reactants are employed. For higher phthalidyl derivatives, two or more molar proportions of phthalaldehydic acid are employed for each molar proportion of polyhydroxy compound. The reaction takes place in the temperature range of from 15° to 170° C. but a range of from 90° to 170° C. is considered preferable from a practical standpoint such as rate of reaction and convenience of operation. The product may be freed of the water of reaction by vaporizing the latter.

In carrying out the reaction, phthalaldehydic acid and the appropriate polyhydroxy compound are mixed and heated for a period of from about five minutes to about three hours. A solvent such as dimethylformamide, acetone or water may be employed, if desired. In certain cases, it may be desirable to employ a catalyst such as potassium acetate, gluconic acid or sulfuric acid. After completion of the heating, the mixture may be subjected to reduced pressure and heating continued to vaporize the water and to obtain the desired phthalidyl derivative as residue. The removal of the water may also be carried out at atmospheric pressure with or without the aid of the passage of air or inert gas over the reaction mixture while heating is continued.

Where the polyhydroxy compound is not readily soluble or fusible, as with certain forms of cellulose or starch, the compound is contacted with phthalaldehydic acid in an appropriate treating medium such as water. The treated polyhydroxy compound is then heated in the temperature range of from 80° to 165° C. to obtain the desired phthalidyl derivative. It is desirable to conduct the heating step in the absence of a large amount of water; hence, if water is used as treating medium the treated polyhydroxy compound may be removed therefrom prior to the heating step or the water evaporated during the heating process. The phthalidyl derivative thus obtained may be purified, if desired, by washing in water and drying.

The following examples illustrate the invention but are not to be construed as limiting.

*Example 1.—1,2,3-tris(phthalidyloxy)propane*

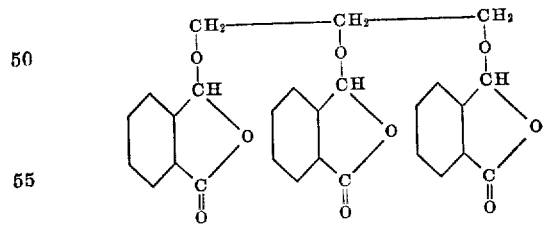

450 grams (3.0 moles) of phthalaldehydic acid and 92 grams (1.0 mole) of glycerol were mixed and heated to 130° C. for two hours. The pressure on the system was reduced to 10 millimeters and water was removed while the temperature was gradually increased to 150° C. The mixture was held at this temperature and pressure for an additional hour and the residue on cooling formed a sticky material having an amber color. The latter was reheated to 180° C. at 15 millimeters pressure and maintained at that temperature for one hour to obtain a 1,2,3-tris(phthalidyloxy)propane product. The latter was an amber-colored brittle solid melting in the temperature range of from 54° to 57° C. The yield of this product was 470 grams or 97 percent of theoretical.

Example 2.—1,2,6-tris(phthalidyloxy)hexane

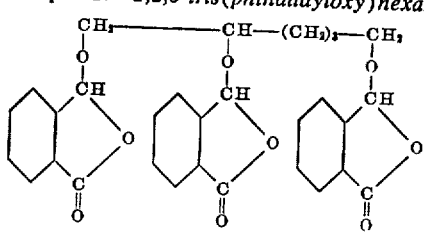

26.8 grams (0.2 mole) of 1,2,6-hexanetriol and 90 grams (0.6 mole) of phthalaldehydic acid were mixed and heated at 120° C. for three hours. The system was evacuated and the water removed by heating to 150° C. A viscous 1,2,6-tris(phthalidyloxy)hexane product having a refractive index of $n_D^{60}$ of 1.5595 was obtained in a yield of 99 grams.

Example 3.—1,3-bisphthalidyloxy-2,2-bis(phthalidyl-oxymethyl)propane

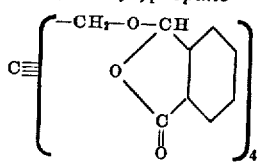

17.1 grams (0.125 mole) of pentaerythritol, 75 grams (0.5 mole) of phthalaldehydic acid and 100 milliliters of water were mixed and heated on the steam bath. The reaction mixture became amber on heating. After a short period, the water was evaporated from the mixture by passing a current of air thereover while the heating was continued to obtain a 1,3-bisphthalidyloxy-2,2-bisphthalidyloxymethylpropane product as a viscous oil. The latter was dried in a vacuum oven at a temperature of from 45° to 55° C. at 15 millimeters pressure whereupon the oily product became a brittle solid. The latter melted from 81° to 84° C.

Example 4.—Phthalidylglucose 54 grams (0.3 mole) of glucose and 45 grams (0.3 mole) of phthalaldehydic acid and 150 mililiters of water were mixed and the solution heated on the steam bath. The water was evaporated under a current of air to obtain a phthalidylglucose product as a sirup. The latter was dried in a vacuum oven at 45° C. and 15 millimeters pressure to obtain a product melting from 60° to 63° C.

Example 5.—Phthalidyl-2,3,4,6-tetraphthalidyl glucoside 18 grams (0.1 mole) of glucose and 75 grams (0.5 mole) of phthalaldehydic acid and 100 milliliters of water were mixed and heated on the steam bath. The water was evaporated under a current of air to obtain a phthalidyl 2,3,4,6-tetraphthalidyl glucoside as a sirup. The latter was put in a vacuum oven at 50° C. and 15 millimeters pressure overnight and then at 85° C. for five days. After cooling, the dried product was a brittle solid melting from 70° to 75° C.

Example 6.—Tetraphthalidylsucrose 42.8 grams (0.125 mole) of sucrose and 75 grams (0.50 mole) of phthalaldehydic acid and 25 milliliters of water were mixed and heated to 110° C. to form a homogeneous solution. The latter was heated in a vacuum oven at about 15° C. for 18 hours to obtain a tetraphthalidyl sucrose product as a solid in an amount of 108 grams or 99 percent of theoretical. The product melted from 69° to 72° C.

Example 7.—Diphthalidylsucrose 60.0 grams (0.175 mole) of sucrose, 52.5 grams (0.35 mole) of phthalaldehydic acid and 20 milliliters of water were mixed and heated to about 80° C. to obtain an amber-colored solution. The latter was dried by heating from 45° to 55° C. at about 15 millimeters pressure for 18 hours to obtain a diphthalidylsucrose product as an amber-colored brittle solid. The latter had a melting point of 69°–71° C.

Example 8.—Phthalidylsucrose 68.5 grams (0.2 mole) of sucrose, 30.0 grams (0.2 mole) of phthalaldehydic acid and 20 milliliters of water were mixed and heated to about 90° C. The resulting solution was heated in the temperature range of from 45° to 55° C. at about 15 millimeters for 16 hours to obtain a phthalidylsucrose product as a brittle solid. The latter had a melting point of 65°–67° C.

Example 9

50 grams of a hydroxypropyl methyl cellulose whose 2 percent solution in water has a viscosity at 20° C. of 50 centipoises was mixed with 750 milliliters of dimethylformamide and the mixture heated until the hydroxypropyl methyl cellulose was completely dissolved. The temperature at this point was about 95° C. 250 grams of phthalaldehydic acid was then added to the hot mixture and heating continued to raise the temperature to 120° C. 25 grams of potassium acetate catalyst was then added to the mixture whereupon the temperature rose to 135° C. and remained at that temperature during the heating period which was continued for thirty minutes thereafter. At the end of this period, the reaction mixture was a somewhat viscous light brown liquid which became gelatinous on cooling. The gel was placed in a Soxhlet extraction apparatus and extracted with acetone for 12 hours, dried in a steam oven for 4 days and then re-extracted with acetone for 7 hours to remove unreacted phthalaldehydic acid, dimethylformamide solvent and water, and to obtain a phthalidyl derivative of hydroxypropyl methyl cellulose. The latter had a decomposition temperature in the range of from 200° to 205° C. The product did not dissolve appreciably in ethanol, piperidine, water, benzene, 80:20 toluene-alcohol, acetone, 50 percent sodium hydroxide, 80:20 ethanol-water and furfural; swelled slightly in methylene chloride, benzaldehyde and morpholine; and swelled in dimethylformamide and acetic acid.

Example 10

10 grams (estimated to contain 0.178 equivalent proportions of hydroxyl groups) of a commercial polyvinyl alcohol, having an average viscosity of 86–89 centipoises for a 4 percent water solution thereof at 20° C., was dissolved in 100 milliliters of water. 4.0 grams (0.027 mole, estimated to react with 15 percent of the hydroxyl groups) of phthalaldehydic acid was added thereto with stirring and heating to form a homogeneous solution. The mixture was allowed to stand at room temperature for six days and thereafter decanted to recover the precipitated solid having spongy, rubber-like properties and holding nearly three times its weight of water. The solid was dried at about 55° C. and 15 millimeters pressure to obtain a cream-colored phthalidyl derivative of polyvinyl alcohol. This product was soluble in dimethylformamide and slightly soluble in hot ethanol. It was substantially insoluble in water and had a low capacity for absorbing water. On heating, the product began to discolor at 200° C.

Example 11

Three strips of 10 ounce cotton duck (consisting primarily of alpha-cellulose) of equal size were thoroughly washed and dried. Two strips were saturated with 5 percent aqueous solution of phthalaldehydic acid and a control strip was saturated with water. All strips were first air-dried, then placed between two plates and heated at a temperature of 165° C. for 5 minutes to cause phthalaldehydic acid to react with the cellulose fibers. Thereafter, the alpha-cellulose reaction products and the control strip were washed in hot running water for 5 minutes and dried at 70° C. The results in terms of weight increase are given below. Variations in moisture content were corrected for on the basis of the variation in weight found in the control strip.

|  | Control Strip | Strip 1 | Strip 2 |
|---|---|---|---|
| Original Weight | 1.9244 | 1.8423 | 1.8733 |
| Final Weight | 1.9171 | 1.9103 | 1.9593 |
| Corrected Weight Gain |  | 0.0753 | 0.0752 |
| Percent Weight Gain |  | 4.1 | 4.0 |

From the foregoing, it was determined that a significant degree of reaction had taken place between the hydroxyl radicals of the alpha-cellulose molecule and phthalaldehydic acid.

Example 12

Three strips of 10 ounce cotton duck (consisting essentially of alpha-cellulose) of equal size were thoroughly washed nad dried. One strip was saturated with acetic acid, the others with a 20 percent solution of phthalaldehydic acid in acetic acid. The samples were then heated at 80° C. for a period of time indicated in the table below to cause phthalaldehydic acid to react with the alpha-cellulose fibers. Thereafter the alpha-cellulose reaction products and the control strip were washed in hot running water and dried. The variations in moisture content were corrected for on the basis of the variation in weight found in the control strip.

|  | Control Strip | Strip No. 1 16 hours | Strip No. 2 40 hours |
|---|---|---|---|
| Original Weight | 2.2240 | 2.3952 | 2.2330 |
| Final Weight | 2.2058 | 2.4598 |  |
| Do | 2.2415 |  | 2.3741 |
| Corrected Weight Gain |  | 0.0828 | 0.1236 |
| Percent Weight Gain |  | 3.5 | 5.5 |

From the foregoing, it was determined that a significant reaction had taken place between the hydroxyl radicals of the alpha-cellulose molecule and the phthalaldehydic acid.

Example 13

10.00 grams of starch, 1.00 grams of phthalaldehydic acid and 200 milliliters of water were mixed and heated on a steam bath for 16 hours to obtain a phthalidyl starch derivative. The water was evaporated during the heating and the product was recovered as a dry yellow residue in an amount of 10.65 grams. The latter was placed in a thimble and extracted with acetone in a Soxhlet extractor for three hours and then dried to obtain a purified product as a pale yellow solid. On heating, the product began to melt at 215° C. accompanied by a gradual decomposition. The acetone extract was evaporated to dryness and the residue dissolved in water and titrated with 0.1 N sodium hydroxide solution. Although phthalaldehydic acid is very soluble in acetone, the titration showed that no detectable amount of said acid was recovered in the acetone extract.

The antimicrobial properties of these compounds may be illustrated by a representative operation wherein a solid agar medium saturated with 1,2,6-tris(phthalidyloxy)hexane gave complete inhibition of growth when streaked with *Staphylococcus aureus* and incubated at 30° C. for three days.

Another example of the antimicrobial properties exhibited by these phthalidyl derivatives of aliphatic polyhydroxy compounds may be illustrated by an operation wherein woven strips of an alpha-cellulose reaction product produced in a manner similar to that described in Example 12 were buried in soil maintained in a chamber held at a temperature of 88° F. and humidity of 95±2 percent for indicated periods of time and then tested to determine their percent retention of tensile or breaking strength. The tensile strength retention is an index of the resistance of the alpha-cellulose reaction product to attack by soil-borne cellulose-rotting organisms. A representative operation is given in the following table:

| Treatment | Percent Weight Gain Due to Treatment With Phthalaldehydic Acid | Percent Retention of Breaking Strength | |
|---|---|---|---|
|  |  | 2 Weeks | 4 Weeks |
| Untreated duck | 0 | 20 | 0 |
| Woven alpha-cellulose reaction product | 7.3 | 86 | 43 |

The phthalaldehydic acid employed in this invention may be prepared by first photochlorinating o-xylene to obtain α,α,α,α',α'-pentachloro-o-xylene by passing chlorine gas into o-xylene while illuminating the sun lamps. The resulting chlorinated o-xylene may be heated with an aqueous solution containing from 4 to 35 percent by weight of a metal halide such as ferric chloride to obtain phthalaldehydic acid, as more fully disclosed and claimed in a copending application of James D. Head and Owen D. Ivins, Serial Number 279,682, filed March 31, 1952, now Patent No. 2,748,162.

We claim:

1. Phthalidyl derivatives of aliphatic polyhydroxy compounds containing at least 3 hydroxy groups and wherein the number of phthalidyl groups per molecule is at least one but is no more than the total number of hydroxy groups in the molecule.

2. Phthalidyl derivatives of aliphatic polyhydroxy compounds according to claim 1 wherein the aliphatic polyhydroxy compound is a monosaccharide.

3. Phthalidyl derivatives of aliphatic polyhydroxy compounds according to claim 1 wherein the aliphatic polyhydroxy compound is a disaccharide.

4. Phthalidyl derivatives of aliphatic polyhydroxy compounds according to claim 1 wherein the aliphatic polyhydroxy compound is a polysaccharide.

5. Phthalidyl derivatives of aliphatic polyhydroxy compounds according to claim 1 wherein the aliphatic polyhydroxy compound is a polyvinyl alcohol.

6. Phthalidyl derivatives of aliphatic polyhydroxy compounds according to claim 1 wherein the aliphatic polyhydroxy compound is a polyhydric alcohol.

7. Phthalidyl derivatives of aliphatic polyhydroxy compounds according to claim 1 wherein the aliphatic polyhydroxy compound is cellulose.

8. Phthalidyl derivatives of aliphatic polyhydroxy compounds according to claim 1 wherein the aliphatic polyhydroxy compound is a cellulose ether.

9. Phthalidyl derivatives of aliphatic polyhydroxy compounds according to claim 1 wherein the aliphatic polyhydroxy compound is starch.

References Cited in the file of this patent
UNITED STATES PATENTS

| 2,047,946 | Austin et al. | July 21, 1936 |
| 2,602,082 | Owen | July 1, 1952 |
| 2,671,779 | Gaver et al. | Mar. 9, 1954 |

UNITED STATES PATENT OFFICE
Certificate of Correction

Patent No. 2,809,965                                                    October 15, 1957

Donald D. Wheeler et al.

It is hereby certified that error appears in the printed specification of the above numbered patent requiring correction and that the said Letters Patent should read as corrected below.

Column 1, lines 44 to 52, the formula should appear as shown below instead of as in the patent—

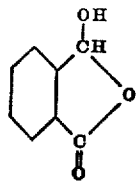

column 5, line 18, for "washed nad" read —washed and—; column 6, line 23, for "illuminating the" read —illuminating with—.

Signed and sealed this 1st day of April 1958.

[SEAL]

Attest:
KARL H. AXLINE,
*Attesting Officer.*

ROBERT C. WATSON,
*Commissioner of Patents.*